United States Patent Office 3,418,295

Patented Dec. 24, 1968

3,418,295

POLYMERS AND THEIR PREPARATION

Arnold Charles Schoenthaler, East Brunswick, N.J., assignor to E. I. du Pont de Nemours and Company, Wilmington, Del., a corporation of Delaware No Drawing. Filed Apr. 27, 1965, Ser. No. 451,300
5 Claims. (Cl. 260—80.72)

ABSTRACT OF THE DISCLOSURE

An addition polymer containing one or more units of vinyl monomers and units of the formula

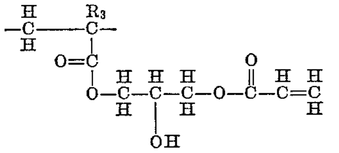

and a process of making such polymers by heating under conditions of reflux in an inert solvent medium in the presence of an organic tertiary amine esterification catalyst and an addition polymerization initiator (1) vinyl addition polymer having a wholly carbon chain and extra-linear glycidyl ester units constituting 10%–100% by weight of the polymer, and (2) sufficient acrylic acid to react with said ester units and recovering a polymeric ester containing extra-linear acrylic ester units.

This invention relates to new polymers, and more particularly to new photopolymerizable compounds and to their preparation.

Various photosensitive compositions comprising monomeric and crosslinkable polymeric compounds and elements embodying them are known. For example, monomer-binder systems comprising an ethylenically unsaturated monomer and a thermoplastic polymeric binder have been used extensively to form relief printing plates and elements for thermal transfer process for image reproduction. Crosslinkable polymeric compositions comprising polymers which have pendent crosslinkable cinnamic acid ester groups are also known and have been used in photoresists. The monomer-polymeric binder systems, in general, require some protection against oxygen desensitization and oxygen induced reciprocity law failure. The photosensitive polymeric compositions which contain photocrosslinkable cinnamic acid ester groups which are pendent from the linear polymer backbone are photodimerizable, of low quantum efficiency and, hence, have low photographic speed. Considerable effort has been expended in the search for more efficient photosensitive compounds as evidenced by numerous patent and literature references that have been published during the past decade.

It is an object of this invention to produce photopolymerizable compositions of high quantum efficiency. Another object is to produce photopolymerizable compositions which are suitable for the manufacture of photoresists. Yet another object is to produce photopolymerizable compositions which do not necessarily require auxiliary binders when utilized as photosensitive layers. A more specific object is to provide photopolymerizable polymers having a wide range of solubility in organic solvents. A further object is to provide a practicable process for preparing crosslinkable photosensitive polymers. Still further objects will be apparent from the following description of the invention.

The process of this invention comprises (a) Reacting in an inert organic solvent solution (1) A vinyl addition polymer having a wholly carbon chain of atoms and extralinear glycidyl ester groups in recurring intralinear units of the formula:

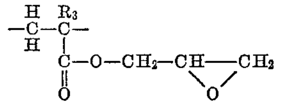

of said chain of atoms, where $R_3$ is H or $CH_3$, said units being present in an amount of 10% to 100% by weight of the polymer, with (2) Acrylic acid in an amount sufficient to react with all the said glycidyl ester groups to form an acrylic acid ester therewith, in the presence of (3) An organic tertiary amine esterification catalyst, and (4) An addition polymerization inhibitor; and recovering a polymeric ester containing extralinear acrylic ester groups from said solution. The polymeric esters have a high quantum efficiency and have a wide range of solubility in organic solvents.

The process can be carried out with homopolymers of a glycidyl acrylate or methacrylate or with copolymers of such an ester or mixture of esters with at least one addition polymerizable vinyl compound selected from the group consisting of acrylic acid, alkyl and hydroxyalkyl esters and α-hydrocarbon substituted acrylic acid alkyl esters and hydroxyalkyl esters and the corresponding nitriles, vinyl esters of fatty acids of 2–5 carbon atoms and N-vinyl pyrrolidones, e.g., N-vinyl-2-pyrrolidones.

The photopolymerizable (crosslinkable) polymers of the invention, for example, can be prepared by polymerizing in an inert organic solvent solution a glycidyl acrylate type monomer with one or more vinyl monomers using a thermal intiator such as N,N'-azo-bis-isobutyronitrile and reacting the polymer so obtained with acrylic acid to form the acrylate ester. The general reaction is as follows:

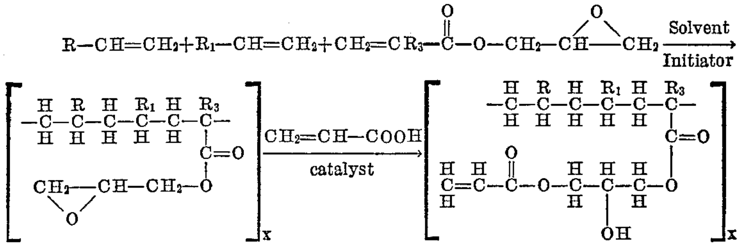

where:

R and $R_1$= —CN, and

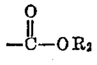

pyrrolidone, etc.

$R_2$ = an alkyl group of 1 to 18 carbons $R_3$ = hydrogen or methyl $x$ = a positive integer The resulting polymerizable copolymer can be coated on a suitable support from an organic solvent solution to form a highly useful photoresist. The usual addition polymerization initiators and other ingredients, such as plasticizers, thermal inhibitors, colorants, fillers, etc. can be admixed with the coating solutions. After imagewise exposure of the coating to actinic radiation, the unexposed portions of the layer may be removed by washing with a liquid which is a solvent for the unexposed polymeric composition but in which the exposed polymerized polymeric composition is essentially insoluble. Chlorinated hydrocarbon solvents, e.g., methylene chloride, carbon tetrachloride, 1,1-dichloroethane and 1,1,2-tri-chlorethylene are quite suitable for this purpose as well as being useful as the coating vehicle. In addition to the chlorinated hydrocarbons, a wide variety of other organic solvents will be found to be useful. The exposed portions of the layer become insoluble and resistant to the conventional etching solutions such as ferric chloride.

In preparing the novel photopolymerizable polymers, the first step is to prepare by addition polymerization, the polymer or copolymer of glycidyl acrylate or methacrylate. It is important to avoid conditions which would tend to open up or otherwise destroy the glycidyl ring, e.g., the presence of strong acids. The comonomer may be any addition polymerizable vinyl compound. The polymers or copolymers are then reacted with acrylic acid to form unsaturated esters of the linear polymeric compounds. During this reaction a polymerization inhibitor, that is, one which is adapted to prevent polymerization through the ethylenically unsaturated group of the acrylic acid, must be present in the reaction mixture. Copper metal, cuprous salts, cupric salts, phenyl-α-naphthylamine, 2,2-methylene-bis(4-ethyl-6-tertiary butyl phenol) and N,N'-di-2-naphthyl-p-phenylenediamine have been found suitable for this purpose.

The preferred polymeric materials containing a glycidyl group are the copolymers of unsaturated glycidyl esters with polymerizable vinyl compounds, namely, compounds having a terminal methylene group attached through a double bond to the adjacent carbon atom. These preferred materials include the copolymers of unsaturated glycidyl compounds formed with acrylic and methacrylic acid esters and nitriles, e.g., methyl acrylate, methyl methacrylate, ethyl acrylate, ethyl methacrylate, 2-hydroxyethyl methacrylate, n-butyl methacrylate, isobutyl methacrylate, and propyl, isopropyl, sec-butyl, tert.-butyl, amyl, hexyl, heptyl, etc., acrylate and methacrylate, acrylonitrile, and vinyl esters, e.g., vinyl acetate, vinyl propionate, vinyl butyrate, vinyl isobutyrate, and vinyl valerate. The preferred glycidyl monomers are glycidly acrylate and glycidyl methacrylate.

All of the copolymers suggested above are, of course, well-known in the art as chemical compounds. However, new crosslinkable polyesters are made by reacting them with acrylic acid to form an unsaturated ester by reaction with the glycidyl group. The crosslinkable polymers and copolymers of the prior art rely on the opening of the epoxide group for crosslinking. In the instant case, polymerization is accomplished through the terminal unsaturated ethylene groups attached to the copolymer by reaction between the epoxide and acid groups.

The initial glycidyl ester reactants are available commercially or may be made in a variety of ways, one of which is the method taught in Dorough, U.S.P. 2,524,432. An exemplary method for making the copolymers is to set up a suitable reaction flask equipped with a stirring means, a heating means and a reflux condenser. The proper amount of solvent, is added and heated to reflux with stirring for at least 5 minutes to remove any dissolved oxygen. The monomer mixture containing a "free radical" addition initiator is added in small portions with stirring and refluxing to control the exothermic polymerization reaction. After all of the monomer/initiator mixture has been added, the mixture is refluxed for about 22 hours. The mixture is cooled slightly and a small amount of cuprous oxide and copper wire is added to inhibit polymerization of the ethylenic group of the acrylic acid. To the reaction mixture there is then added the acrylic acid and a tertiary amine catalyst. The mixture is heated to reflux for at least 17 hours. The mixture is then cooled and added to a large volume of violently agitated water. The resulting precipitate is filtered and washed with pure water several times and dried in moving air at 35–40° C. Alternatively, the refluxed reaction mixture may be passed through an ion exchange column containing an ion exchange resin in basic form to remove the copper ions and excess acid. The resulting eluate is dried by azeotropic distillation or by a chemical drying agent. The purification procedure may also be carried out using activated alumina. A further method of purification involves extraction of the polymerizable polymer by the addition of an equal volume of methyl ethyl ketone and then a concentrated aqueous salt solution such as 20% potassium chloride. Drying is accomplished by azeotropic distillation.

To form a photosensitive layer for use as a photoresist, a solution of the polymerizable polymer in a suitable solvent is made up in a concentration of 10–50% solids and coated on a support, usually copper metal, and dried. Photoinitiators and plasticizers and optionally, an inert polymeric filler are also added to the coating solutions along with a small amount of an antioxidant. After drying, the photoresist is imaged by exposure to actinic radiation through a lithographic negative in a conventional vacuum printing frame. Generally about a 30 second exposure to a carbon arc source is sufficient. After exposure, the resist image is developed by bathing the element in a liquid which is a solvent for the unexposed polymer but in which the exposed polymer is essentially insoluble. After development, the resist image is submitted to ferric chloride etching whereby the copper metal not protected by the resist is etched away leaving a high quality metal relief image under the resist. The resist may be removed by any suitable liquid which is a solvent for the photopolymerized polymer. The above polymerizable, polymeric compositions and photoresists made therefrom are particularly useful in the printed circuit field. For example the exposed polymerized resist may be removed by soaking the etched image in methylene chloride which swells the polymer. Mechanical scrubbing with stiff fiber brush followed by a fresh methylene chloride rinse adequately removes the polymer resist.

This invention will now be further illustrated in and by the following examples. All parts are by weight unless otherwise specified.

EXAMPLE I

In a 1-liter three-necked round bottom flask equipped with a mechanical stirrer, a water-cooled reflux condenser, a dropping funnel and an electric heating mantle, there was charged 400 grams of benzene which was heated to reflux for five minutes. To the dropping funnel there was added a mixture of 50.4 grams methyl methacrylate (containing 50 p.p.m. of methylhydroquinone as an inhibitor), 20.3 grams of N-vinyl-2-pyrolidone, 29.3 grams of glycidyl acrylate and 1 gram of N,N'-azo-bis-iso-butyronitrile as an initiator. Addition of 1/13 of the volume of this mixture was added rapidly to the refluxing solvent and this was repeated every 10 minutes. The total addition time was 2 hours and this was necessary to control the exothermic polymerization reaction. After the final addition, the stirring was stopped and the mixture was heated at reflux for 22 hours. The reaction mixture was cooled slightly and 0.5 gram of cuprous oxide and some copper wire were aded. To the reaction mixture there were then added 32.9 grams of acrylic acid and 17.7 grams of N,N'-diethyl-cyclohexylamine as a catalyst. The mixture was then heated to reflux for 17 hours. At the end of the refluxing period, the reaction mixture was cooled and added to violently agitated water in a ratio of one part by volume of reaction mixture to 15 parts of water. The copper catalyst remained in the reaction vessel. The precipitated product was filtered and washed twice with water and dried in forced air at a temperature of 35–40° C.

A solution was made up containing 10% solids in 1,1,2-trichloroethylene using the above crosslinkable polymeric product. The solution contained 80.9% of the polymeric product, 6.5% 2-t-butylanthraquinone, 12.5% triethylene glycol diacetate and 0.1% of 2,2′-methylene-bis(4-ethyl-6-tertiary butyl-phenol). The resulting solution was dip-coated on a copper-clad fiber glass support intended for use as a printed circuit. Just prior to coating, the copper surface of the support was degreased and cleaned by vapor spraying with the solvent used for the coating solution, scouring with an abrasive powder, rinsing with water, soaking for one minute in 6 N hydrochloric acid, washing with water and drying. After coating, the photosensitive layer was air dried and then exposed for 30 seconds through a lithographic type negative in a conventional vacuum printing frame by means of a carbon arc exposing device identified as a "Nu-Arc Plate Maker (flip-top)" manufactured by the Nu-Arc Company, Chicago, Ill. After exposure, the resist image was developed by bathing in 1,1,2-trichloroethylene which removed all of the unexposed polymeric material, leaving unaffected all of the exposed areas. After development, the resist image was etched by placing the element in a "Chemcut Model 600 Spray Etcher," manufactured by Division of Centre Circuits, Inc., State College, Pa. The etching apparatus contained a 45° Baumé ferric chloride solution. The element was etched for 3 minutes/1.3 mil copper. The copper was cleanly etched away wherever the unexposed polymer had been washed away by solvent bathing, leaving a highly useful copper relief under the resist. The exposed photopolymer remaining need not be removed but if desired, it may be by soaking the resist in methylene chloride which swells the polymerized polymer so that it may be moved by mechanical scrubbing.

EXAMPLE II

The procedure of Example I was repeated using the following monomeric compounds and catalyst of Example I.

| | Grams |
|---|---|
| Methyl methacrylate | 25.0 |
| n-Butyl methacrylate | 29.6 |
| N-vinyl-2-pyrrolidone | 18.6 |
| Glycidyl acrylate | 26.8 |

After the copolymerization reaction was carried out as described in Example I, there were added 30.1 grams of acrylic acid and 16.3 grams of the catalyst, N,N′-diethylcyclohexylamine. At the end of the refluxing period, the crosslinkable polymeric product was extracted and purified by passing the reaction mixture through an ion exchange resin column containing a weekly basic resin (Amberlyst A–21 Rohm & Haas) and then through a column containing a weakly acid resin (Amberlyte IRC–50 Rohm & Haas), and then drying by azeotropic distillation.

The polymerizable, polymeric material was made into a composition as described in Example I, coated, exposed and processed to form a high quality copper image relief similar to that obtained in Example I.

EXAMPLE III

The procedure of Example I was repeated using the following monomeric compounds and the catalyst of Example I.

| | Grams |
|---|---|
| Methyl methacrylate | 53.1 |
| Acrylonitrile | 5.1 |
| N-vinyl-2-pyrrolidone | 10.8 |
| Glycidyl acrylate | 31.0 |

After the copolymerization reaction was carried out as described in Example I, there were added 34.9 grams of acrylic acid and 18.8 grams of N,N′-diethylcyclohexylamine as a catalyst. At the end of the refluxing period, the cross-linkable, polymeric reaction product was extracted and purified by passing the reaction mixture through a column of activated alumina and then filtered to remove any aluminates formed. The eluate was concentrated by distillation.

The polymerizable polymeric product resulting from the above procedure was made up into a photopolymerizable coating having the following composition:

| | Percent |
|---|---|
| Crosslinkable copolymer | 81.0 |
| 2-t-butylanthraquinone | 6.5 |
| Triethylene glycol diacetate | 12.5 |
| Methyl ethyl ketone to make a 20% solids solution. | |

The photoresist solution was coated, dried, exposed and processed as described in Example I to give a satisfactory copper relief plate.

EXAMPLE IV

The procedure of Example I was repeated except that the reaction flask was charged with methyl ethyl ketone instead of benzene as the reaction solvent and the following monomeric compounds were used with the "azo" catalyst of Example I.

| | Grams |
|---|---|
| Methyl methacrylate | 52.3 |
| Acrylonitrile | 5.0 |
| Glycidyl acrylate | 30.4 |
| 2-hydroxyethyl methacrylate | 12.4 |

At the completion of the copolymerization reaction and after the addition of the cuprous oxide and copper wire, there were added 34.2 grams of acrylic acid and 18.4 grams of N,N′-diethylcyclohexylamine as a catalyst. After refluxing for 17 hours, the mixture was cooled, an equal volume of benzene added and extracted by adding the reaction mixture to a 20% aqueous solution of potassium chloride. The product was dried by azeotropic distillation.

The product was suitable for making a photoresist as described in Example III where methyl ethyl ketone benzene mixture was used as the solvent for the coating solution.

EXAMPLE V

The procedure of Example I was repeated using 400 grams of methyl ethyl ketone as the reaction solvent and the following monomeric compounds with the "azo" catalyst:

| | Grams |
|---|---|
| Methyl methacrylate | 54.4 |
| Acrylonitrile | 10.5 |
| Glycidyl methacrylate | 35.1 |

At the completion of the copolymerization reaction, there were added 35.6 grams of acrylic acid and 19.1 grams of the catalyst, N,N′-diethyl cyclohexylamine. The product was isolated and extracted as described in Example IV to provide a polymerizable polymer suitable for making a photoresist.

EXAMPLE VI

The procedure of Example I was carried out in methyl ethyl ketone solvent in the following amounts of monomeric materials:

| | Grams |
|---|---|
| Methyl methacrylate | 60.1 |
| N-vinyl-2-pyrrolidone | 9.3 |
| Glycidyl acrylate | 29.6 |

After copolymerization, 33.3 grams of acrylic acid and 18 grams of the amine catalyst were added. The polymerizable polymeric composition resulting from the completion of the reaction procedure was suitable for use as a photoresist as described in Example I.

EXAMPLE VII

The procedure of Example I using benzene as the reaction solvent and the "azo" catalyst was carried out using the following monomers:

| | Grams |
|---|---|
| Methyl methacrylate | 45.9 |
| Acrylonitrile | 19.1 |
| Glycidyl acrylate | 35.0 |

After the completion of the copolymerizing reaction and the addition of cuprous oxide and copper wire, 39.3 grams of acrylic acid and 21.2 grams of the N,N-diethylcyclohexylamine were added. After recovery of the product and drying, the polymerizable polymer obtained was suitable for making a photoresist as described in Example I.

EXAMPLE VIII

The procedure of Example I using methyl ethyl ketone as the reaction solvent and the "azo" catalyst was carried out with the following monomers:

| | Grams |
|---|---|
| Methyl methacrylate | 52.6 |
| Acrylonitrile | 13.9 |
| Glycidyl acrylate | 33.6 |

After completion of the copolymerization reaction and the addition of cuprous oxide and copper wire, 7.8 grams of acrylic acid and 20.4 grams of the amine catalyst were added. After recovery of the product and drying, the polymerizable copolymer obtained was suitable for making a photoresist by coating a solution of the polymeric material made up in methyl ethyl ketone, as described in Example III.

EXAMPLE IX

The procedure of Example I using methyl ethyl ketone as the reaction solvent and the "azo" catalyst carried out with the following monomers:

| | Grams |
|---|---|
| Methyl methacrylate | 26.1 |
| n-Butyl methacrylate | 37.0 |
| Glycidyl methacrylate | 37.0 |

After completion of the copolymerization reaction and the addition of cuprous oxide and copper wire, 37.5 grams of acrylic acid and 20.2 grams of the amine catalyst were added. After recovery of the product and drying, the polymerizable copolymer obtained was suitable for making a photoresist using 1,1,2-trichloroethylene as the coating solution solvent.

EXAMPLE X

The procedure of Example I was carried out in methyl ethyl ketone as the reaction solvent using the "azo" catalyst. Glycidyl methacrylate in an amount of 100 grams was added as the only polymerizable monomer. After the completion of the polymerization reaction the polymer was reacted with 101.5 grams of acrylic acid in the presence of 54.6 grams of the amine catalyst, to form a polymerizable polymer which was suitable for making a photoresist when coated from a solution of methyl ethyl ketone.

EXAMPLE XI

The procedure of Example I was carried out in methyl ethyl ketone using the "azo" catalyst and the following monomers:

| | Grams |
|---|---|
| n-Butyl methacrylate | 42.7 |
| Acrylonitrile | 3.9 |
| Glycidyl methacrylate | 53.4 |

After completion of the copolymerization reaction and the addition of cuprous oxide and copper wire, 54.2 grams of acrylic acid and 29.2 grams of the amine catalyst were added. The polymerizable copolymer obtained from the reaction was suitable for making a photoresist layer as described in Example III.

EXAMPLE XII

The procedure of Example I using methyl ethyl ketone was carried out using the "azo" catalyst and the following monomers:

| | Grams |
|---|---|
| Methyl methacrylate | 59.1 |
| 2-hydroxyethyl methacrylate | 11.8 |
| Glycidyl acrylate | 29.1 |

After the completion of the copolymerization reaction and the addition of cuprous oxide and copper wire, there were added 32.8 grams of acrylic acid and 17.6 grams of the amine catalyst. The polymerizable copolymer obtained was suitable for use as a photoresist layer.

EXAMPLE XIII

The following monomers were copolymerized using the procedure of Example I and methyl ethyl ketone as the reaction medium.

| | Grams |
|---|---|
| Methyl methacrylate | 36.5 |
| n-Butyl methacrylate | 51.8 |
| Glycidyl acrylate | 140.0 |

In this reaction 2.3 grams of the initiator, N,N'-azo-bis-isobutyronitrile was used instead of 1 gram as in Example I. At the end of the copolymerization reaction and the addition of cuprous oxide and copper wire, there were added 157.4 grams of acrylic acid and 84.7 grams of N,N'-diethyl cyclohexylamine as a catalyst. At the completion of the reaction, a polymerizable copolymer was obtained which was suitable for use as a photoresist layer. The copolymer was soluble in 1,1,2-trichloroethylene.

EXAMPLE XIV

The procedure of Example I was carried out using methyl ethyl ketone, the "azo" catalyst and the following monomers:

| | Grams |
|---|---|
| Methyl methacrylate | 63.6 |
| Acrylonitrile | 5.2 |
| Glycidyl acrylate | 31.3 |

At the completion of the copolymerization reaction and the addition of cuprous oxide and copper wire, there were added 35.2 grams of acrylic acid and 19 grams of the amine catalyst. A polymerizable copolymer was obtained which was soluble in 1,1,2-trichloroethylene and was suitable for use as a photoresist layer.

EXAMPLE XV

The quantities of the monomers of Example IX were changed as follows:

| | Grams |
|---|---|
| Methyl methacrylate | 15.0 |
| n-Butyl methacrylate | 21.4 |
| Glycidyl methacrylate | 63.7 |

All other conditions according to the procedure of Example I were carried out. Acrylic acid in an amount of 64.6 grams and 34.8 grams of the amine catalyst were added to form the unsaturated polymerizable copolymer which differs from the copolymer of Example IX in that it is soluble in methyl ethyl ketone but essentially insoluble in 1,1,2-trichloroethylene.

EXAMPLE XVI

The procedure of Example I was carried out using methyl ethyl ketone and the "azo" catalyst but using the following monomers:

| | Grams |
|---|---|
| Methyl methacrylate | 67.9 |
| Glycidyl methacrylate | 32.1 |

The resulting copolymer was reacted with 32.6 grams of acrylic acid in the presence of 17.5 grams of the amine catalyst to form a polymerizable copolymer useful as a photoresist. The copolymer was insufficiently soluble in trichloroethylene to give a good coating composition but could be completely dissolved in methyl ethyl ketone.

EXAMPLE XVII

The procedure of Example I was carried out using 483 grams of methyl ethyl ketone, 1.3 grams of the "azo" catalyst and the following monomers:

| | Grams |
|---|---|
| Mehyl methacrylate | 35.0 |
| n-Butyl methacrylate | 21.3 |
| Glycidyl methacrylate | 71.0 |

The resulting copolymer was reacted with 72 grams of acrylic acid in the presence of 25 grams triethylamine as a catalyst. The resulting polymerizable copolymer was soluble in methyl ethyl ketone.

EXAMPLE XVIII

The above Example XVII was repeated with the following monomers:

| | Grams |
|---|---|
| Methyl methacrylate | 25.0 |
| Iso-butyl methacrylate | 35.5 |
| Glycidyl methacrylate | 71.0 |

The resulting polymerizable copolymer was insoluble in the trichloroethylene but soluble in methyl ethyl ketone from which it could be coated to form a resist.

EXAMPLE XIX

The procedure of Example I was carried out using 422 grams of methyl ethyl ketone, 2.3 grams of the "azo" catalyst and the following monomers:

| | Grams |
|---|---|
| n-Butyl methacrylate | 60.0 |
| Ethyl methacrylate | 48.2 |
| Glycidyl methacrylate | 120.0 |

The resulting copolymer was reacted with 122 grams of acrylic acid in the presence of 65.5 grams of the catalyst, N,N'-diethyl-cyclohexylamine to form a polymerizable copolymer suitable for use as a photoresist.

EXAMPLE XX

In the manner of Example I in 483 grams of methyl ethyl ketone and in the pressence of 1.42 grams of the "azo" catalyst, 56.8 grams of n-butyl methacrylate and 85.2 grams of glycidyl methacrylate were reacted to form the copolymer. The copolymer was then reacted with 86.4 grams of acrylic acid in the presence of 30 grams of triethylamine to form the polymerizable copolymer.

EXAMPLE XXI

In the manner of Example I using 280 grams of methyl ethyl ketone and 1 gram of the "azo" catalyst, the following monomers were reacted to form the copolymer.

| | Grams |
|---|---|
| Methyl methacrylate | 33.3 |
| Acrylonitrile | 17.7 |
| Glycidyl methacrylate | 42.6 |

The copolymer was in turn reacted with 26 grams of acrylic acid in the presence of 3.7 grams of triethylamine to form a useful polymerizable polymer.

EXAMPLE XXII

Using 822 grams of methyl ethyl ketone and 2.72 grams of "azo" catalyst, 172 grams of methyl acrylate and 102 grams of glycidyl acrylate were reacted to form the copolymer. The copolymer was reacted with 79.2 grams of acrylic acid in the presence of 11.1 grams of triethanolamine to form the polymerizable copolymer.

EXAMPLE XXIII

In 1429 grams of methyl ethyl ketone in the presence of 7.61 grams of "azo" catalyst, 675 grams of methyl methacrylate and 86 grams of glycidyl acrylate were reacted to form the copolymer. The copolymer, in turn, was acrylated by reacting with 620 grams of acrylic acid in the presence of 124 grams of N,N'-diethyl-cyclohexylamine to form an unsaturated polymerizable copolymer. This copolymer had a molecular ratio of methyl methacrylate to acrylated glycidyl acrylate of 9 to 1. The process was repeated using 562.5 grams of methyl methacrylate, 214 grams of glycidyl acrylate and 600 grams of acrylic acid to give a mole ratio of 3 to 1. Both polymerizable copolymers were soluble in trichloroethylene solvent.

EXAMPLE XXIV

A photopolymerizable composition was made using 32.9 grams of the photopolymerizable polymer of Example XIV, 15.9 grams of the copolymer poly(methyl methacrylate 2-hydroxyethyl methacrylate) (ratio 90/10), 7.2 grams of triethylene glycol diacetate, 3.9 grams of 2-t-butyl anthraquinone, 0.3 gram 2,2'-methylene bis(4-ethyl-6-t-butylphenol) and methyl ethyl ketone to make 240 grams.

The solution was coated on 0.001 inch polyethylene terephthalate film support and dried at room temperature. A copper clad fiber glass support was prepared as described in Example I. The coated film was then laminated to the copper clad fiber glass support with the photopolymerizable layer in contact with the copper surface. The lamination was carried out by means of a set of pressure rollers heated to 120° C. at a laminating speed of 5 inches per minute. The resulting element was exposed to a lithographic image and to a 5, 10, 20, 40, 80, and 160-second time step wedge through the polyethylene terephthalate film by means of 45-ampere carbon arc at 18". The film support was then stripped from the photopolymer layer which was then developed as described in Example I. All of the unexposed material was removed by the solvent leaving a good image of the six steps of the wedge indicating good photospeed and exposure latitude.

The resulting image is useful as an (1) Etchant resist toward 35% ferric chloride
(2) Etchant resist toward ammonium persulfate
(3) Electroplating resist (solder plating at 3.5 amps./sq. ft. for 15 minutes produces a suitable element)
(4) The resist image can also be prefluxed with a white solder flux and the element dipped into a molten solder bath at 220° C. The resist withstands this treatment and only the exposed copper is coated with solder.

EXAMPLE XXV

The photopolymerizable composition of Example XXIV was coated on a 0.004 inch thick polyethylene terephthalate film support containing an anchoring layer as described in Alles et al., U.S. 2,627,088. Over the dried photopolymerizable layer there was laminated a 0.001 inch thick unsubbed polyethylene terephthalate film by means of pressure rollers heated to a temperature of about 127° C. The laminated element was then exposed as described in Example XXIV and the 0.001 inch thick cover film stripped off and the unexposed portion of the photopolymerizable polymer was thermally transferred to the copper clad fiberglass support described in Example I in the manner described in Heiart U.S. 3,060,026. The thermally transferred image was etched for 4 minutes in 42° Baumé ferric chloride as described in Example I. All of the unexposed copper was etched away, leaving unaffected the copper image covered by the resist.

By using aluminum foil in place of copper clad fiberglass in the above examples, a high quality printing plate could be prepared which was highly suitable in office duplicating machines and similar applications.

Suitable inert organic solvents for use in the invention in addition to those described above include ketones (acetone, diethyl ketone, methylbutyl ketone, etc.), esters (methyl acetate, ethyl acetate, butyl acetate, etc.), acetonitrile, dimethyl sulfoxide, toluene, benzene, xylene, chlorinated hydrocarbons, dioxane, cellosolves, diacetone alcohol.

The proportions of the glycidyl ester and the monomeric materials which may be copolymerized therewith may be varied over a wide range depending on the characteristics desired in the polymerizable polymer, such as, for example, the adhesion to a support when the material is coated activated by a photoinitiator activatable by actinic radiation. As indicated by the above examples, the amount of glycidyl ester may be as high as 100% by weight and as low as 10% based on the total weight of polymerizable materials. If there is appreciably less than 10% of polymerized glycidyl compound based on the total weight of polymerizable materials, there will not be enough glycidyl groups present to react with acrylic acid to provide a sufficient number of appending unsaturated groups for photopolymerizing. That is, the number of available unsaturated groups will be in such short supply that the photopolymerizing reaction will not provide a sufficient difference in solubility between the exposed and unexposed areas of the photoresist to allow development of the image by solvent washing. On the other hand, if the glycidyl portion is present in proportions approaching 100% based on the total weight of polymerizable materials, the resulting polymers become more limited in their application due to limitations in solubility characteristics and other related physical properties. In addition, many of the vinyl comonomers are less expensive than the glycidyl esters, therefore, the use of higher quantities of the latter is economically unattractive.

It will be understood, of course, by those skilled in the art that this invention is not limited to the specific ingredients named in the above illustrative examples nor to the particular proportions and methods of copolymerization mentioned therein. Instead of N,N'-azo-bis-isobutyronitrile, there may be used benzoyl peroxide, acetyl peroxide, benzoyl acetyl peroxide, succinyl peroxide, ditertiary butyl peroxide, peracetic acid, tetralin peroxide, lauryl peroxide, cumene peroxide and urea peroxide. The concentration of initiator is usually small, that is, for the preferred "azo" initiator from, by weight, about 1 part to about 3 or 4 parts of initiator per one hundred parts of the monomeric mixture.

In utilizing the above photopolymerizable polymers as photoresists it is sufficient to say that they are suitable for preparing resist images for all types of photomechanical reproduction process. Supports other than the copper clad fiberglass of Example I may be used. The photopolymerizable compositions may be coated on lithographic paper printing plate's support carrying a greasy ink-repellent layer. The resulting layer, after exposure and solvent development to reveal the non-image exposed ink repellent areas of the support, can be used directly as a printing plate. Metallic plates of copper, zinc, steel, and aluminum can also be used since the novel polymerizable polymeric compositions have good adhesion to any of these surfaces depending on the proportions used in preparing the polymeric compounds.

Other photoinitiators in addition to the 2-t-butylanthraquinone of Example I may, of course, be used. For example, there may be mentioned 9,10-anthraquinone, 1-chloroanthraquinone, 2-chloroanthraquinone, 2-methylanthraquinone, 2-ethylanthraquinone, 1,4-naphthaquinone, 9,10-phenonthrenequinone, 1,2-benzanthraquinone, 2,3-benzanthraquinone, 2-methyl-1,4-naphthoquinone, etc. Of course, other compounds active in this respect and known to those skilled in the art as photoinitiators activatable by actinic radiation for photopolymerizable systems may also be used. For example, the photoreducible dyes and reducing agents disclosed in Oster, U.S. Patents 2,850,445; 2,875,047; 3,097,096; and Oster et al., U.S. 3,074,794; 3,097,097; and 3,145,104. In addition, dyes of the phenazine, oxazine, and quinone classes may be used.

As indicated above, various dyes and pigments, may be added to increase the visibility of the relief image.

In addition to the plasticizer, triethylene glycol diacetate set forth in Example I, the following exemplary plasticizers and others known in the art may be used: triethylene glycol dipropionate, dibenzyl sebacate, diphenyl phosphate and dibutyl phthalate.

The novel photopolymerizable polymers and elements of this invention may be used in any of those processes disclosed in assignee's Burg and Cohen, U.S. Patents 3,060,023; 3,060,024; 3,060,025 and Heiart, 3,060,026, and in assignee's Colgrove, U.S. Ser. No. 403,938, filed Oct. 14, 1964, and Jeffers, U.S. Ser. No. 407,245, filed Oct. 28, 1964.

The photoresists comprising the photopolymerizable polymeric compositions offer many advantages over the prior art. They are far superior to the bichromated glue or albumin layers because they are much less sensitive to atmospheric conditions and can be sensitized during manufacture. In all cases the photoresists of the invention give cleaner resist images under less critical conditions of development than do the above bichromate plates. The photopolymerizable polymeric compositions of this invention have the advantage over other known photopolymerizable compositions in that they do not require an auxiliary binder although a small amount of an inert polymer may be added as a filler. The photoresist compositions of this invention also have the advantage of being less sensitive to oxygen desensitization and oxygen induced reciprocity failure. This is probably due to the fact that the novel polymerizable polymers are preformed linear polymers requiring very little further polymerization to form the final polymer whereas monomer-binder systems must form the linear polymers as well as crosslink. The relatively little polymerization necessary in the system of this invention allows the polymerization reaction to effectively compete with oxygen which is a powerful inhibitor of free-radical carbon-to-carbon polymerization. Although the photopolymerizable polymers have been described with reference to the preparation of photoresists, they may be used in other applications, where photopolymers have been useful, for example in, copying, printing, decorating and manufacturing applications. Pigments, e.g., titanium dioxide, colloidal carbon, metal powders, phosphors, etc., and dyes which do not appreciably absorb light at the wave length being used for exposure or which inhibit polymerization can be incorporated in the photopolymerizable polymeric composition. The compositions may also be used in color reproductions.

I claim:

1. A process for making a polymeric ester which comprises (a) reacting by heating under conditions of reflux in an inert organic solvent solution (1) a vinyl addition polymer having a wholly carbon chain of atoms and extralinear glycidyl ester groups in recurring intralinear units of the formula:

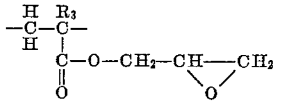

of said chain of atoms, where $R_3$ is a member selected from the group consisting of H and $CH_3$, the units of said formula consisting 10% to 100% by weight of the polymer with (2) acrylic acid in an amount sufficient to react with all the said glycidyl groups present in the polymer to form an acrylic acid ester therewith, in the presence of (3) an organic tertiary amine esterification catalyst, and (4) an addition polymerization inhibitor; and (b) recovering a polymeric ester containing extralinear acrylic ester groups from said solution.

2. A process according to claim 1 wherein said solvent is methylene chloride.

3. A process according to claim 1 wherein said solvent is benzene.

4. A process according to claim 1 wherein said solvent is 1,1,2-trichlorethylene.

5. An addition polymer containing a plurality of units of the formulae

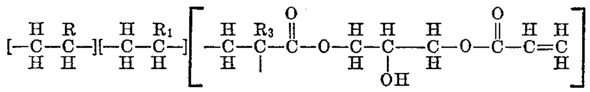

where R and $R_1$ are each a member taken from the group consisting of —CN.

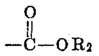

and pyrrolidone, $R_2$ is an alkyl group of 1 to 18 carbon atoms, $R_3$ is a member selected from the group consisting of H and $CH_3$.

References Cited

UNITED STATES PATENTS 2,580,901 1/1952 Erickson et al. ------ 260—86.1

JOSEPH L. SCHOFER, *Primary Examiner.*

HARRY WONG, JR., *Assistant Examiner.*

U.S. Cl. X.R.

260—80.75, 86.1, 80.8, 85.5, 32.8, 41, 80.3; 161—216, 218, 219, 247; 117—127, 128.4; 204—158; 96—115